AMERICAN STANDARD CODE FOR INFORMATION INTERCHANGE (ASCII)

| b7 b6 b5 → | | | | | 0 0 0 | 0 0 1 | 0 1 0 | 0 1 1 | 1 0 0 | 1 0 1 | 1 1 0 | 1 1 1 |
|---|---|---|---|---|---|---|---|---|---|---|---|---|
| Bits b4 ↓ | b3 ↓ | b2 ↓ | b1 ↓ | COLUMN → / ROW ↓ | 0 | 1 | 2 | 3 | 4 | 5 | 6 | 7 |
| 0 | 0 | 0 | 0 | 0 | NULL | DLE | SP | 0 | \` | P | @ | p |
| 0 | 0 | 0 | 1 | 1 | SOH | DCI | ! | 1 | A | Q | a | q |
| 0 | 0 | 1 | 0 | 2 | STX | DC2 | " | 2 | B | R | b | r |
| 0 | 0 | 1 | 1 | 3 | ETX | DC3 | # | 3 | C | S | c | s |
| 0 | 1 | 0 | 0 | 4 | EOT | DC4 | $ | 4 | D | T | d | t |
| 0 | 1 | 0 | 1 | 5 | ENO | NACK | % | 5 | E | U | e | u |
| 0 | 1 | 1 | 0 | 6 | ACK | SYNC | & | 6 | F | V | f | v |
| 0 | 1 | 1 | 1 | 7 | BELL | ETB | ' | 7 | G | W | g | w |
| 1 | 0 | 0 | 0 | 8 | BS | CNCL | ( | 8 | H | X | h | x |
| 1 | 0 | 0 | 1 | 9 | HT | EM | ) | 9 | I | Y | i | y |
| 1 | 0 | 1 | 0 | 10 | LF | SS | * | : | J | Z | j | z |
| 1 | 0 | 1 | 1 | 11 | VT | ESC | + | ; | K | [ | k | { |
| 1 | 1 | 0 | 0 | 12 | FF | FS | , | < | L | ~ | l | — |
| 1 | 1 | 0 | 1 | 13 | CR | GS | − | = | M | ] | m | } |
| 1 | 1 | 1 | 0 | 14 | SO | RS | . | > | N | ^ | n | l |
| 1 | 1 | 1 | 1 | 15 | SI | US | / | ? | O | _ | o | DEL |

FIG. 1

INVENTOR
J. W. WHITESEL
BY [signature]
ATTORNEY 3,386,553

EDITORIAL CORRECTING TYPEWRITER UTILIZING DATA SEARCH AND INFORMATION RETRIEVAL TECHNIQUES

James Warren Whitesel, Western Springs, Ill., assignor to International Telephone and Telegraph Corporation, New York, N.Y., a corporation of Delaware Filed Apr. 26, 1967, Ser. No. 633,905
10 Claims. (Cl. 197—20)

ABSTRACT OF THE DISCLOSURE

A typist stores a memory of data identifying a particular piece of typing. Then, she feeds a perforated tape into an automatic typewriter. Responsive to the command signals appearing on the tape, the typewriter types out until it comes to the piece of typing identified by the stored data. At that point, the typewriter stops, and she makes the necessary corrections.

This invention relates to automatic typewriters and more particularly to typewriters for making editorial corrections.

Automatic typewriters are devices for typing out a clean copy responsive to command signals stored on a recording medium. The recording medium may take any desired form, such as: perforated tape, magnetic tape, or the like. For present purposes, this description speaks only of perforated tape; however, it must be understood that the term is used generically. The invention is broad enough to cover any suitable recording media.

Editorial corrections are changes which are made in the text material appearing on the tape without having to manually retype the entire text. The prior art includes many disclosures of how these corrections may be made after the tape is in the position where the correction is desired. Thus, there is no real problem connected with making the corrections after the typewriter has stopped at the desired point in the text. The problem is to provide a low cost means for automatically finding the proper point and stopping the typewriter thereat without involving either an expense which is considered excessive or an extensive amount of human control. Even more important, there should not be any need for unnatural responses by the typist. Otherwise, she might become frustrated and make more errors.

Accordingly, an object of this invention is to provide new and improved automatic typewriters capable of making editorial corrections in a manner which is natural and intuitive for the typist. In this connection, an object is to provide an extremely low cost—but reliable—device for finding a point in the text material where an editorial correction is desired. A further object is to accomplish these ends in a manner which does not require the human operator to have special training.

More particularly, an object is to provide means by which a typist may stop a typewriter at any desired point in a predetermined text within a predetermined probability that the first stop will be the correct stop. Moreover, an object is to eliminate most of the need for human supervision over an automatic typewriter during the making of editorial corrections. Here an object is to accomplish these and other objects without unduly raising the cost of the control circuit.

In accordance with one aspect of the invention, these and other objects are accomplished by means using an information retrieval technique. By any one of a number of alternative means, a typist first stores a memory of the command signals which appear on the tape at the point where the typewriter is supposed to stop. The typewriter is then put into operation, and it unrestrictedly types out a clean copy of the text stored by the perforations on the tape. As the typewriter types, the circuit of the invention scans the tape for the command signals which are stored in its memory. When there is a match between the command signals stored on the tape and in the memory, the typewriter stops. If that stop is at the correct place for making the desired editorial correction, the typist makes such correction in a known manner. If not, she pushes a start key, and the typewriter resumes its operation by typing out the clean copy of the text stored on the tape until there is another match between the command signals on the tape and in the memory. Then the typewriter stops once more.

The invention contemplates a trade off whereby the nature of a text which might reasonably be expected is analyzed by known traffic engineering techniques. Then, the inventive machine is designed to give a grade of service which corresponds to the acceptable cost of the machine. Thus, a high grade of service might be given wherein the typewriter almost never stops except at the exact pointw here a correction is desired. Or, a low grade of service might be given wherein the typewriter often stops at places where the typist must restart it without making a correction. The decision of whether to give a high or a low grade of service turns upon whether the cost of the machine is high or low as compared with the cost of the typist time.

The above mentioned and other features and objects of this invention and the manner of obtaining them will become more apparent, and the invention itself will be best uderstood by reference to the following description of an embodiment of the invention taken in conjunction with the accompanying drawings, in which:

FIG. 1 shows the well known ASCII code used here, by way of example, to describe some aspects of the invention;

The invention may be adapted to use any suitable code of command signals which are capable of identifying the atcion to be taken by the typewriter. However, so that a concrete example may be given, the invention is described herein as using the well known ASCII code (shown in the table of FIG. 1). As those skilled in the art know, this code identifies each symbol or stunt by a seven bit binary word. These words are formed by combining the symbols shown of the table in the bit positions $b_7$, $b_6$, $b_5$, $b_4$, $b_3$, $b_2$, $b_1$, respectively. Stated another way, the seven bits are assembled by combining the three symbols at the top of the columns in front of the four symbols at the left of the row. For example, a dollar mark is identified by the binary word 0100100 (the first three bits "010" are found at the top of column 2, and the last four bits "0100" are found at the left on row 4). The composition of all other binary words in the ASCII code should be apparent from an inspection of the table.

Figure 2:
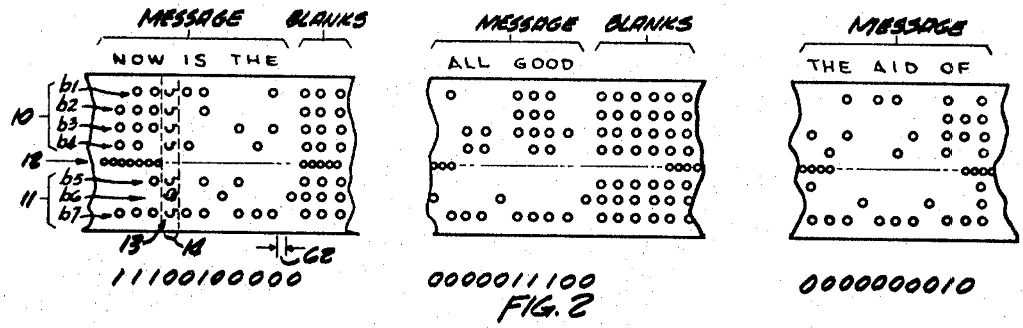
FIG. 2 shows a number of short pieces of perforated tape for storing ASCII code command signals which may be used to drive a typewriter.

The "0" marks in this code indicate an absence of a perforation on a tape, and the "1" marks indicate the presence of a perforation. The sections of tape in FIG. 2 are drawn to show seven tracks 10, 11 of perforated holes separated into two groups by means of a row of sprocket holes 12. Each track is read by a separate brush. The first bit ($b_7$) or element in the binary word is shown nearest the bottom of the tape.

The tape is adapted to be run through a reader of any suitable design. By way of example, the drawing shows a series of seven brushes 13 riding on the tape and positioned over the seven tracks of perforated holes. Whenever a perforation or hole appears, the brush reading the track containnig that hole falls through the hole and touches a grounded plate 14 to give a "1" signal. In the absence of such a hole or perforation, the brush is separated from the ground plate 14 by the insulation material of the tape to give an "0" signal. Therefore, the seven brushes 13 read in parallel and give out a continuous stream of coded binary word signals which identify the character to be typed or the action to be taken by the typewriter. As drawn, the brushes 13 are reading the binary word 0100000 (a letter space or word separator in the ASCII Code).

The tape of FIG. 2 has series of binary word codes perforated therein which represent the message signals which the typewriter will print out. In this case, it is the test message "now is the . . . all good . . . the aid of" written in the ASCII code. Each tape section is shown as ending with a binary word having a hole in every position, the word 1111111, here called "Blanks." According to the ASCII code, the typewriter deletes or ignores the blank signals and does nothing positive responsive thereto [the last symbol "Del" (FIG. 1)]. The invention takes advantage of this delete by using blanks on a correction tape to indicate that the typewriter must stop.

The message symbols have characteristics which may be utilized to stop the typewriter without requiring the typewriter stopping circuit to read each binary word in detail. These characteristics may vary somewhat according to the nature of the text. However, for any given kind of text material (e.g. English, Spanish, mathematical, tabular, etc.) there is a predictable characteristic which may be studied by known traffic study techniques to discover the nature of a comparison which is required to detect a place, within predictable limits, where the typewriter should stop. In greater detail, a binary word containing seven "1's" stops the typewriter and, therefore is irrelevant. Conversely, all binary words having six or less "1's" are pertinent. Therefore, to provide a simple characteristic which may be used to control the typewriter, the binary words may be divided into two classes (i.e. those having three or less "1's" and those having four or more "1's"). Arbitrarily, it is here assumed that a comparison is adequate for an acceptable grade of service when ten successive binary words are compared and found to have the same succession of words falling into these two classes. It is thought that this is a reasonable assumption; however, it should be understood that it is here made solely for the purposes of this description and further that it is not to be construed as a limitation upon the invention. Another estimate could be made that the characteristics for classifying the words to form an address could be found by reading of ten successive words on only two tracks of perforations, for example. If so, it is thought that a comparison of ten words is an adequate comparison, within a given grade of service, for the purposes of an English language text.

According to one aspect of the invention, a typist types a letter (for example) and simultaneously makes a perforated message tape. Any time that the message tape is thereafter run through the typewriter, it automatically types out a clean copy of that same letter. To make editorial corrections in this clean copy, the typist first observes where the corrections are required. Next, she makes a correction memory tape by typing at least a minimum number of the ten characters which appear immediately before the spot where the correction is required. Then she stops where she wants the typewriter to stop and perforates the tape with blanks. Thereafter, she simultaneously feeds into the typewriter the message tape and the correction tape. The typewriter types out a clean copy of the original letter, stopping when the characteristics on the message tape correspond to the characteristics on the correction tape which indicates a possible point where the typist may have stopped when she made the correction tape. If this is in fact the place where a correction is to be made, the typist makes it. If not, she pushes a start button, and the typewriter resumes its automatic typing of the clean copy until it again finds a correspondence of characters between the correction tape and the message tape.

According to a further aspect of the invention, the typist does not have to count back ten characters when she types the correction tape. She may type any number of characters on the correction tape as long as she types at least the minimum number of ten characters. With just a little practice, she soon learns to judge an inch or so, of the line in the text material and to type that much.

After she has typed the minimum number of ten characters before a correction is required, she pushes a button and at least one binary word 1111111 is punched into the correction tape. Then, she types a minimum number of at least ten characters before the next and every succeeding correction, pushing the button to perforate the word 1111111 following each correction at the spot where the typewriter is to stop.

Figure 3:
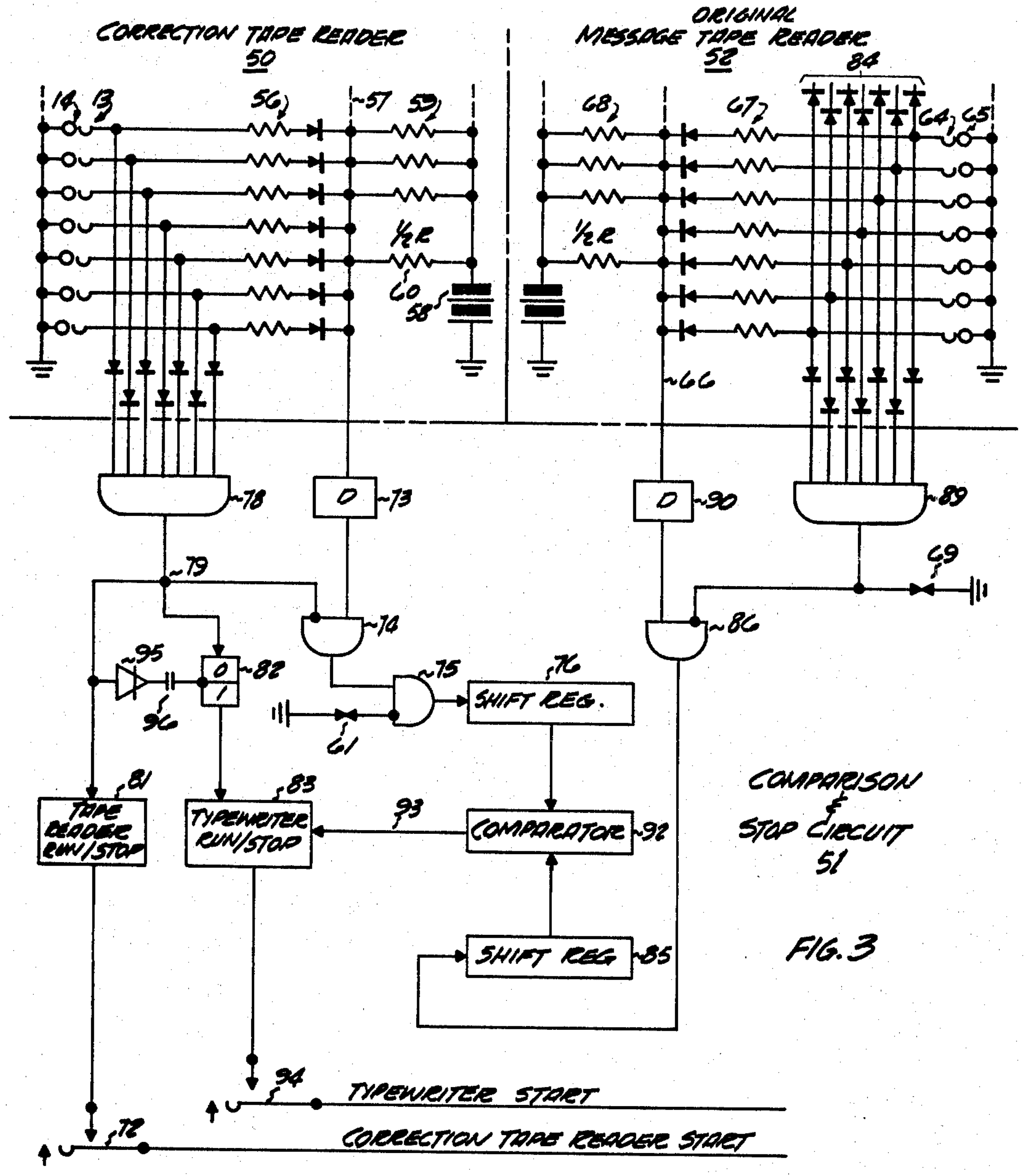
FIG. 3 is a schematic circuit diagram of an embodiment showing one exemplary means utilizing a perforated correction tape as a memory for stopping an automatic typewriter.

FIG. 3 shows a circuit which is used to coordinate the correction tape with the original message tape. The major parts of this circuit are divided by dot-dashed lines to indicate a correction tape reader 50, a comparison and stop circuit 51, and an original message tape reader 52.

The correction tape is run through the reader 50 between the brushes 13 and a ground bus or plate 14. Either a perforation or the insulation material of a non-perforated tape may be interposed between any one of the brushes 13 and the ground bus 14. If the perforation is present, a ground potential appears on the corresponding brush to indicate a binary bit "1". If no perforation is present, no ground appears on the associated brush to indicate a binary bit "0."

Each of the brushes 13 is connected through an individually associated resistor 56 to a summing bus 57. The resistance of each of these resistors is as nearly identical to the resistance of all other resistors as is conveniently possible. Therefore, if for example, three perforations are under any of the brushes 13 at a given time, ground is applied to the summing bus 57 through three parallel and equal resistors. If the tape takes one step and then five perforations, for example, are under the brushes 13, ground is applied to the bus 57 through five parallel and equal resistors. In like manner, each time that the tape steps, a binary word is read out, and ground is applied to the summing bus 57 through a number of parallel resistors which corresponds to the number of "1's" in the binary word which is then being read.

Also, permanently connected between the summing bus 57 and a battery 58 are a selected number of resistors 59. Each of the resistors 59, except one, has a resistance value which is as nearly as possible equal to the individual resistance of each of the resistors 56. The one non-equal resistor 60 has a resistance which is approximately one-half the resistance of the other resistors. Thus, the summing bus 57 is connected to the battery 58 via three and one-half parallel resistance units.

Upon reflection, it should be apparent that if the brushes 13 encounter a binary word represented by any number from zero to three perforations, in any position, the summing bus 57 receives three and one-half units of battery potential and three or less units of ground potential. Therefore, the net potential on the summing bus 57 has the polarity of the battery 58. On the other hand, if the brushes 13 encounter a binary word represented by any number from four to six perforations, the bus 57 receives three and one-half units of battery potential and four to six units of ground potential. Obviously, therefore, the bus 57 is at net ground potential. Upon reflection, it is seen that this circuit divides the binary words into two classes—either three or less "1's" in one class or four or more "1's" in the other class. It provides either a ground or a negative output signal (which may be described as either a "1" or a "0") depending upon whether the binary word falls into one of the other of these two classes.

The tape motion is coordinated with the reading of the binary words. Symbolically, this coordination is here shown as a set of contacts 61 which may be riding on a gear associated with the sprocket wheel that cooperates with the row of holes 12 on the tape of FIG. 2. Alternatively, the contacts 61 may be a brush for reading an extra row of holes in the tape. In any event, the contacts 61 are arranged to close between each reading of a binary word from the tape of FIG. 1 and inhibit operation so that the space (such as 62, FIG. 1) between the words is not interpreted as a word in class one.

The original message tape reader 52 is constructed in a manner which is similar to that described above in connection with the correction tape reader 50. The original message tape runs through the space between the brushes 64 and the ground bus 65. Each "1" in a binary word (represented by a perforation on the original tape) causes an energization of the summing bus 66 via a corresponding one of the seven parallel and equal resistors 67. The voltages applied through these parallel resistors 67 are compared with the standard voltage applied through the three and one-half resistors 68. Again, the voltage divisions are such that the bus 66 has one polarity when the "1's" in the binary word stored on and read from the original tape are three or less and the opposite polarity when the "1's" are four or more. Again, a synchronizing device 69 sends out a signal between each binary word read from the message tape to inhibit the storage of a symbol representing a word having less than three "1's."

The remaining components in "Comparison and Stop Circuit" 51 are logic symbols which will be understood best from a description of how the circuit operates. For a textbook treatment of these and other logic functions described herein, reference may be had to either or both of the books "Logic Design of Digital Computers" by Phister, or "Understanding Digital Computers" by Seigel, both published by John Wiley and Sons.

The typist observes the text material and prepares the correction tape (FIG. 2) by typing at least ten characters before each correction. Each time that she wants the typewriter to stop, she stops and pushes a button to run a few blanks on the tape (i.e. perforate the word 1111111). Next, she puts the correction tape on the correction tape reader 50 so that it passes between the reading brushes 13 and the ground bus 14. She puts the original message tape on the reader 52 so that it passes between the reading brushes 64 and the ground bus 65.

Then, she pushes a reader start key 72 which causes the correction tape to run under the brushes 13. Each binary word that is read out causes a potential having a class identifying polarity to appear on the summing bus 57 for indicating the number of "1's" in the word that is then being read out. For example, the message "now is the" results in the binary word address 11100100000 (each "1" indicates that four or more perforations are read simultaneously). This is eleven bits, and it has been assumed that only ten bits are used for such an address. However, this does not cause any problems because the circuit will lose the first bit and leave the binary word address 1100100000. In a similar manner, the message "all good" results in the binary word address 0000011100, and the message "the aid of" results in the binary word address 0000000010. Clearly, each of these address words uniquely identifies a particular passage in the text.

Each of the potentials appearing on the summing bus 57 is applied through a delay circuit 73 and two inhibit gates 74, 75, to store either a "1" or a "0" in the shift register 76 (FIG. 2). After this "1" or "0" is stored, contacts 61 close to inhibit the gate 75 and prevent any storage in the shift register 76 while the tape steps. The stored signal is transferred to the second section of the shift register when the second binary word is read out, and to the third section when the third word is read out. In like manner, a second and a third class signal are stored in the first section and then shifted to the second section of the shift register when these words are read out. The process is repeated every time that a binary word is read out from the correction tape. Since it has been assumed that no more than ten characters may be stored in the shift register 76, it will fill up and then begin to lose the stored signals in the order in which they were stored. Therefore, the shift register always stores the last ten bits that were received.

The blank symbol (binary word 1111111) comes under the brushes 13 when the correction tape reaches the point where the typewriter is supposed to stop. Since every one of the brushes is then reading a perforation, every input of the AND gate 78 is energized, and an output signal appears at 79. This signal at 79 energizes a tape reader stop circuit 81 and stops the transportation mechanism for the correction tape. The signal appearing on bus 57 responsive to the blank symbol does not cause any effect in the shift register 76 because there is a slight delay at the delay circuit 73. Before the end of this delay period, the signal at 79 inhibits the gate 74 to prevent any change in the signals already stored in the shift register 76. Thus, the delay is long enough to insure the inhibition of the gate 74 before the shift register 76 can store any signal representing the blanks. This delay has no significant effect during the normal tape reading process before AND gate 78 conducts to inhibit the gate 74. Therefore, at this time, the shift register 76 is storing a ten bit binary word which is in effect, the address of the location where the typewriter is supposed to stop. In the case of the message "now is the" (FIG. 2) this address is the word "1100100000" (recall that the first "1" was lost when the shift register went over capacity).

The signal at 79 also sets a flip-flop circuit 82 so that it applies an enable voltage from its "1" side to the "TYPEWRITER RUN/STOP" circuit 83. This starts the transport mechanism for the original message tape reader 52 which reads out the command signals stored on the original tape. As each command signal is read out from the original tape, a signal is sent over the conductors at 84 to cause the typewriter to take the commanded action or to type the indicated character. In addition, the binary word signals read from the original tape are applied through the resistor field 67 to the summing bus 66. Again, the polarity on summing bus 66 is at a negative potential if the read out word contains three or less "1's" and at the ground potential if it contains four or more "1's." The shift register 85 stores a bit which is "0" responsive to a negative polarity and is "1" responsive to the ground potential. The interlock device 69 and inhibit gate 86 function, in the same manner as the interlock device 61 and inhibit gate 75 function, to prevent a false storage in register 85 of a non-existing signal while the original tape steps.

The typewriter deletes or performs no action responsive to the blanks or binary word 1111111 on the message tape. Therefore, a typist studying a clean copy has no way of knowing where such blanks may occur, and she cannot anticipate them by inserting such blanks on to the correction tape. Moreover, even if she could do so, she would merely cause a false stop when the gate 78 conducts. Hence, the circuit includes an AND gate 89 which inhibits the gate 86 whenever the binary word 1111111 is read from the message tape by the brushes 64. The delay circuit 90 delays the storage of an address bit in register 85 during a period which is long enough to insure an inhibition of the gate 86 before any signal can reach the register 85. Clearly then, any delete signal read by the brushes 64 has no effect upon the symbols stored in the shift register 85.

The typewriter continues to take all actions and to type all characters indicated by the binary word symbols stored on the original message tape and read out by the brushes 64. As each word is read out, an address bit signal is stored in the first stage of the shift register 85, and all signals previously stored in the register are shifted one stage. After ten such address bits have been stored, the shift register 85 begins to lose the bits which it has already stored. Thereafter, as each now address bit is inserted into storage, the shift register 85 stores a new ten bit binary address word beginning with the last stored bit. In effect, this word is the address of the location in the original text of the point at which the typewriter is typing at the given time of storage.

A comparator 92 continuously compares the ten bit address word read out from the correction tape and stored in the shift register 76 with every ten bit address word read out from the original message tape and stored in the shift register 85. Whenever the comparator 92 detects two address words which are the same, a signal appears at 93 to energize the "TYPEWRITER RUN/STOP" circuit 83. The typewriter stops.

The typist looks at the copy just typed responsive to signals from the original message tape to determine whether the typewriter has stopped at a proper place where a correction is required. If so, she types a correction with known results. If not, she momentarily pushes a non-locking typewriter start key 94 to start the typewriter and continues the reading of the message tape, hereafter, the automatic typing continues until it again comes to another point in the original text where the ten bit address word stored in the shift register 85 corresponds to the address word stored in the shift register 76. Then, the typewriter stops again with the above described results.

After any correction has been made, the typist momentarily pushes the non-locking correction tape reader start key 72 and circuit 81 causes the correction tape reader to advance. The blanks (word 1111111) pass out from under the reader brushes 13, and the AND gate 78 turns off. The potential disappears from the point 79, and inverter 95 turns on. A pulse passes through the capacitor 96 during the interval while it charges. This pulse resets the flip-flip 82 at its "0" side to remove the signal from the "TYPEWRITER RUN/STOP" circuit 83. The typewriter cannot operate at this time. The disappearance of the potential from the point 79 also removes the inhibit from the gate 74 and deenergizes the tape reader stop circuit 81. The correction tape reads out the next message signals (here "all good") to store the ten bit address of the next corrections in the shift register 76. For example, in FIG. 2, this next address 0000011100 identifies the words "all good" including the letter space after "*d*." When the next set of blanks (1111111) are read, the AND gate 78 conducts with the above described results, thus leaving the ten bit address word 0000011100 stored in the register 76. The flip-flip 82 sets to its "1" side to energize the circuit 83. The typewriter types out a clean copy according to the signals stored on th original message tape. Again, the address bits are stored at 92 responsive to this clean copy typing. When there is a match between the two address words, the typewriter stops.

The described process repeats until the correction tape comes to an end, and the typewriter has typed all of the material indicated by the symbols stored on the original message tape.

The foregoing description has covered the situation where the typist makes a correction tape which stores the information required to stop the typewriter wherever a correction is required. However, it should be understood that the invention is broad enough to cover a direct storage of the correction address. For example, in FIG. 4, there is no correction tape. Instead, the typist operates a typewriter 100 to directly store a predetermined number of the conventional ASCII code command symbols in a shift register 101. For example, this operation may store in the register 101 each of five binary words corresponding to the five characters appearing immediately before a desired stop. These symbols represent the address of the place in the text where the typewriter is supposed to stop.

The original message tape 102 is read while the typewriter types the indicated text. During this automatic typing operation, each of the words read off the tape 102 is stored in the shift register 103. When the same symbols are stored in both of the shift registers 101 and 103, the comparator 104 sends a signal which stops both the transport for the original tape 102 and the automatic typing by the typewriter 100. Then, the typist either pushes a non-locking key 106 to restart the automatic typing or types a correction, depending upon her observations of the freshly typed copy. After she has made such a correction, she pushes a reset button 107 to clear the register 101. Then she types to store the address of the next correction in the register 101, and the process repeats.

Sometimes there are special circumstances where it is desirable to stop the automatic typing every time a specially selected character is read out from the original message tape. For example, it may be desirable to type form letters quoting prices and to change the prices in each form letter. Thus, it becomes desirable to stop the automatic typing every time that a dollar mark is typed. In another example, it may be desirable to type a standard table, but to insert special data in columns on a table. If so, it is desirable to stop the typewriter each time that a horizontal tabulation signal is read off the tape. Other similar special circumstances will readily occur to those skilled in the art.

Figure 5:
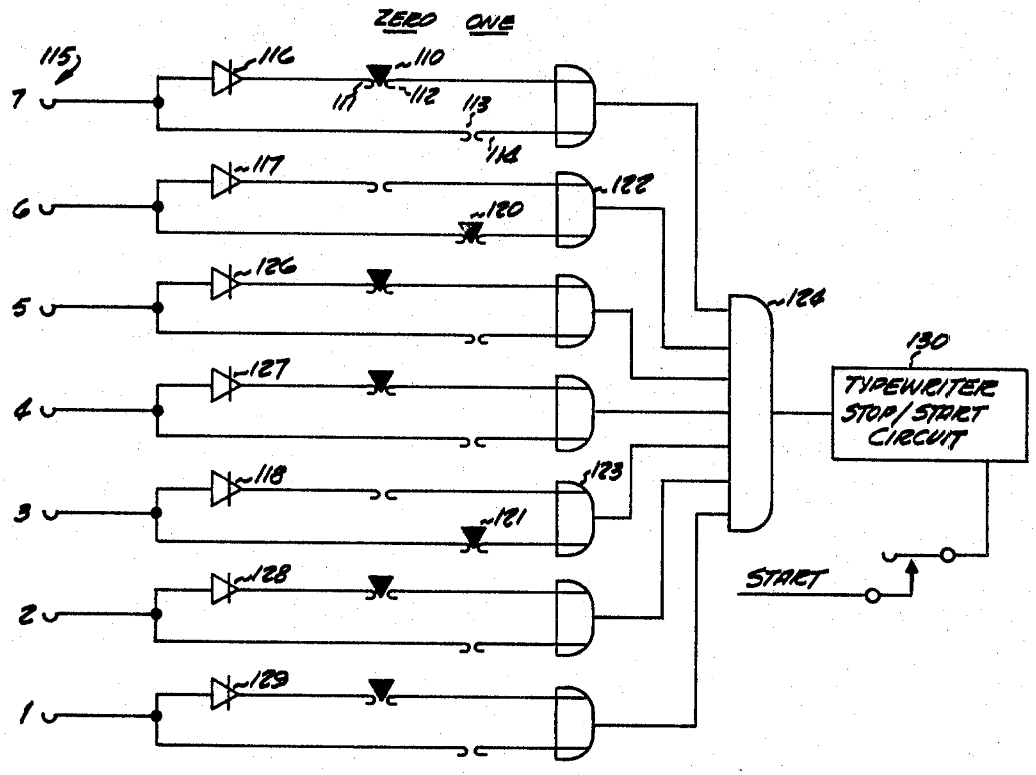
FIG. 5 shows yet another embodiment of the invention whereby a typist may select any arbitrary symbol or code by means of a plug board.

To accomplish this selected symbol stop, the typist is provided with a control panel which includes two rows of jacks (FIG. 5) designated "zero" and "one." Each row includes seven jacks which correspond to the bit positions of the code which is used. The typist is provided with a number of shorting plugs which she can selectively insert into nay of the holes. Thus, for example, if the typist wants to change price quotations, she wants to stop the typewriter when it encounters a dollar mark. Therefore, she consults the ASCII code table (FIG. 1) and observes that the dollar mark is identified by the binary word 0100100. Then, she inserts a plug in each of the jacks 7, 5, 4, 2, 1 in the "zero" column and in each of the jacks 6 and 3 of the "one" column, as shown in FIG. 5. Of course, she could store any other binary word simply by moving these plugs, as for example hte code 0001001 which indicates a horizontal tab.

Each of the jacks is a set of open springs. Each plug is a conductor which shorts the springs when the plug is inserted into the jack. Thus, for example, the plug 110 shorts the springs 111 and 112 to interconnect them electrically. There is no plug between the springs 113, 114; therefore, they are an open electrical circuit.

The seven brushes 115 read the perforated original message tape. A hole in the tape results in a potential on the corresponding brush. Hence, when the binary word 0100100, which represents a dollar mark, is read, brushes 6 and 3 are energized through holes in the tape, and none of the other brushes are energized. The symbol 116 identifies an inverter gate which has an output signal unless it is marked at its input. Therefore, each inverter, except 117 and 118, has an output when the binary word which identifies a dollar mark is read from the tape. By inspection, brushes 6 and 3 rest in perforations, and an electrical signal passes through the plugs 120, 121 and OR gates 122, 123 to two inputs of the AND gate 124. None of the other brushes 1, 2, 4, 5, and 7 rest in a perforation when a dollar mark is indicated. Hence, inverters 116 and 126–129 conduct to energize the remaining inputs of the AND gate 124 via plug 110 and similarly positioned plugs in the zero jacks. When the AND gate 124 conducts, the circuit 130 conducts to stop the typewriter. The typist then either types a correction or pushes the start key.

Figure 4:
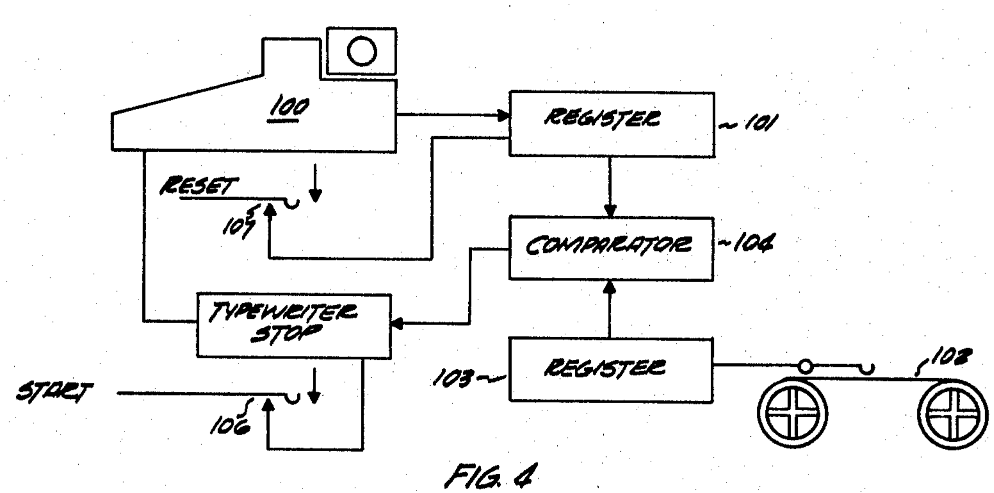
FIG. 4 shows another alternative embodiment having a directly keyed register for stopping the typewriter.

The invention is broad enough to cover any convenient form of data retrieval type of stopping responsive to a correction address registration. FIG. 3 has taught that the symbols may be classified into one or two classes to produce an address; FIG. 4 has taught that the command signals may be stored directly; FIG. 5 has taught that plugs may be used to store a particular symbol. It is equally within the scope of the invention to store all or any part of each pertinent binary word. The decision as to what form of storage is adequate turns upon the relative cost of the computer components versus the convenience of the human operator. Usually, the decision of how much or how little information to store in the electrical controls is made on a basis that the typist should be expected to help the machine as much as possible as long as she does not require special training to do so and as long as the actions which she must take are not more expensive than the data storage information.

While the principles of the invention have been described above in connection with specific apparatus and applications, it is to be understood that this description is made only by way of example and not as a limitation on the scope of the invention.

I claim:

1. An editorial correction typewriter comprising a first coded memory means, and means for automatically typing out a clean copy of the text encoded by successive codes in said first coded memory, a second coded memory means having stored therein the address of a point in said clean copy at which a correction is to be made, said address consisting of a code derived from a plurality of successive codes which occur in said first memory means and which immediately precede the point at which it is desired to make a correction, means for reading successive addresses from said first coded memory as said clean copy is typed, means for continuously comparing said stored address with said successive addresses read from said first coded memory means as said clean copy is typed, and mean responsive to detection of said stored address occurring in said first coded memory for stopping said typewriter.

2. The typewriter of claim 1 and means for thereafter restarting said typewriter to resume the clean copy typing of said text.

3. The typewriter of claim 1 wherein said address storage means comprises means for storing a plurality of successive addresses of a number of points where corrections are desired, said addresses being separated by typewriter stopping signals, and means for advancing said address storage means after each correction, thereby preparing said typewriter for the next stopping point.

4. The typewriter of claim 3 and means for selectively restarting said typewriter without making said advance of said address storage, thereby retaining the same address.

5. The typewriter of claim 1 wherein said address storage comprises means for classifying typewriter control signals according to a predetermined characteristic, means for storing data identifying a succession of said classifications as said address, said comparing means comprising means for comparing a classification of the typewriter command signals which cause said clean copy type out with said stored succession data, and means responsive to an appearance of data identifying a predetermined number of said classifications in said text in the same succession as said address for causing said stopping of said typewriter.

6. The typewriter of claim 1 wherein said means for storing said address comprises a register having a predetermined capacity for data storage, means for storing address symbols in the order in which they appear, and means responsive to the register reaching said capacity for losing said address symbols in the order of succession in which they are stored, whereby said storing means always stores the last of said predetermined number of said signals in the order in which they appear.

7. The typewriter of claim 1 and means whereby said correction address storage means comprises a first perforated correction tape, said clean copy is stored on a different perforated tape, and said comparison means comprises means for comparing the perforations on said two tapes.

8. The typewriter of claim 7 and means for stopping said correction tape responsive to an appearance of a predetermined data information appearing thereon, and means responsive to said appearance of said predetermined data for inhibiting the storage of any address information responsive thereto.

9. The typewriter of claim 1 wherein said address storage means comprises means for storing a predetermined number of selected command signals for commanding said typewriter to type out said clean copy.

10. The typewriter of claim 1 and means for storing a single specially selected command signal as said address symbol.

References Cited

UNITED STATES PATENTS

| | | | |
|---|---|---|---|
| 2,646,155 | 7/1953 | Cardon | 197—20 |
| 2,788,886 | 4/1957 | Paulding et al. | 199—18 |
| 2,905,299 | 9/1959 | Hilderbrandt | 197—20 |
| 2,954,860 | 10/1960 | Woodhead | 197—19 |
| 2,968,383 | 1/1961 | Higonnet et al. | 197—20 |
| 3,260,340 | 7/1966 | Locklar et al. | 197—19 |

ROBERT E. PULFREY, *Primary Examiner.*

E. BURR, *Examiner.*